Figure 1:
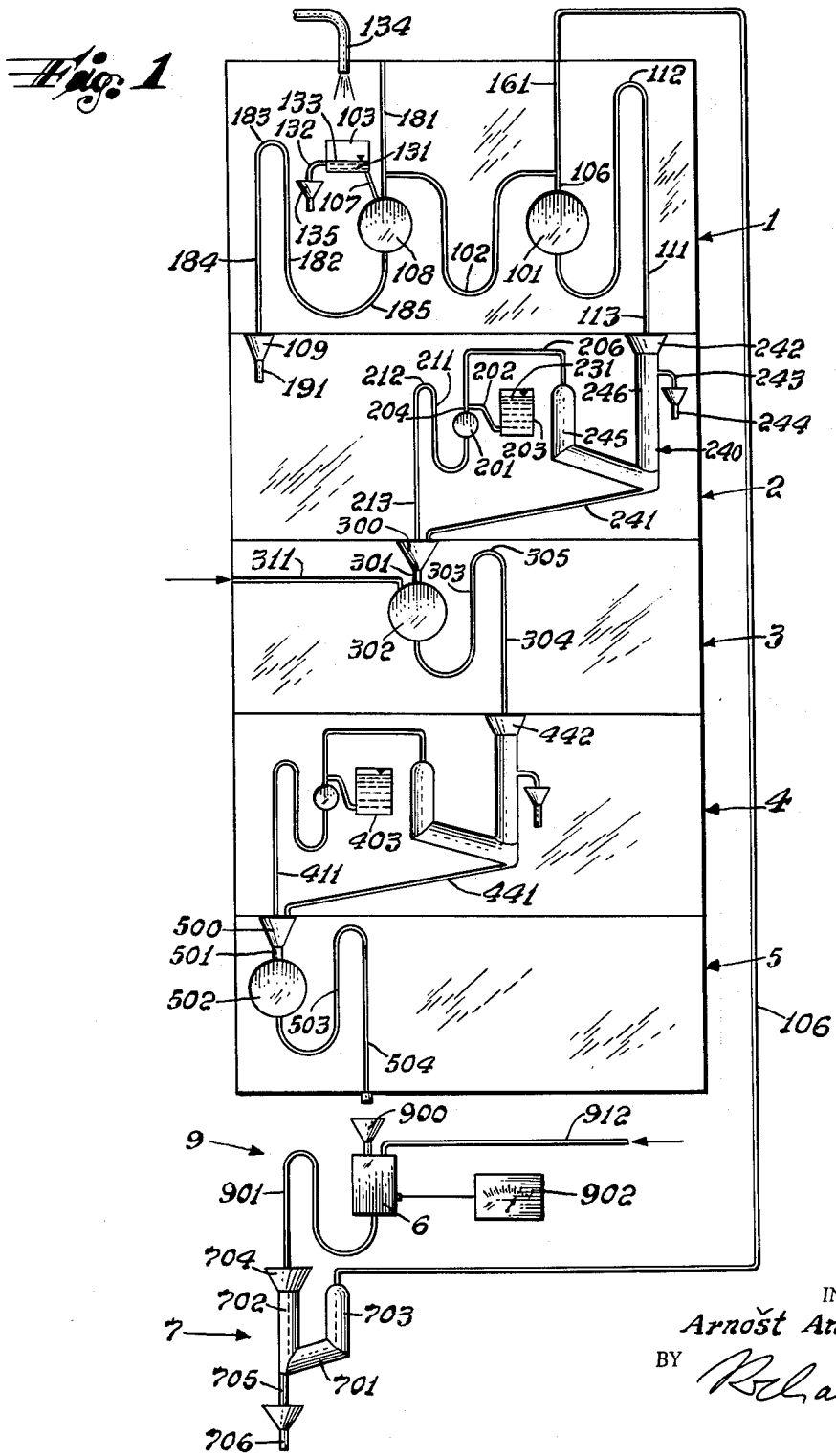

July 5, 1966     A. ANSCHERLIK     3,259,462
AUTOMATIC ANALYZING DEVICE AND METHOD Filed Aug. 23, 1962     2 Sheets-Sheet 1

INVENTOR.
Arnošt Anscherlik

INVENTOR.
Arnošt Anscherlik

United States Patent Office 3,259,462
Patented July 5, 1966

3,259,462
AUTOMATIC ANALYZING DEVICE AND METHOD
Arnost Anscherlik, Prague, Czechoslovakia, assignor to Vyzkumný ústar energeticky, Prague, Czechoslovakia
Filed Aug. 28, 1962, Ser. No. 219,832
Claims priority, application Czechoslovakia, Sept. 4, 1961, 5,344/61
12 Claims. (Cl. 23—230)

This invention relates to automatic chemical analysis, and more particularly to devices and methods for automatically performing chemical analyses of a standardized type on samples of a liquid.

It is known automatically to draw samples from a liquid process stream in an industrial chemical process, automatically to add predetermined amounts of reagents, and automatically to measure a physical property of the resultant reaction mixture. The range of physical properties which may be measured automatically in the reaction mixture and which are correlated in a known manner with the chemical composition of the original sample is wide. The measured properties may be essentially mechanical, such as viscosity or specific gravity, optical such as selective absorption of certain wavelengths of light, or electrical such as conductivity or hydrogen ion activity. This invention is not directly concerned with the nature of the chemical reaction performed during analysis, nor with the nature of the physical measurement made on the reaction product.

Known automatic analyzing devices rely on metering apparatus which involves mechanical parts moving relative to each other, such as membrane pumps, plunger pumps, metering valves, and the like. The performance of such apparatus deteriorates by wear of frictionally engaged elements, by loss of elasticity in membranes, and due to similar factors unavoidable in moving mechanical elements.

The primary object of this invention is the provision of analyzing apparatus of the type described which does not rely on moving mechanical elements in its metering devices.

Another drawback of conventional automatic analyzing devices is their reliance on mechanical drives for performing the critical metering operations. Another object of the invention is the provision of automatic analytical apparatus in which liquid is metered without direct action of any mechanical drive. More specifically, the invention aims at analytical apparatus embodying metering devices in which liquid flow is energized solely by gravity.

Conventional automatic analyzing equipment frequently employs relatively complex programming devices which sequentially initiate the steps of the analytical process. A further object of the invention is the provision of automatic analytical apparatus in which at least some of the steps of the analytical process automatically generate signals which trigger or initiate other steps of the analytical process so that the use of external programming devices may be avoided or held to a minimum. According to a specific feature of the invention, the signals generated are pulses of fluid pressure.

Figure 2:
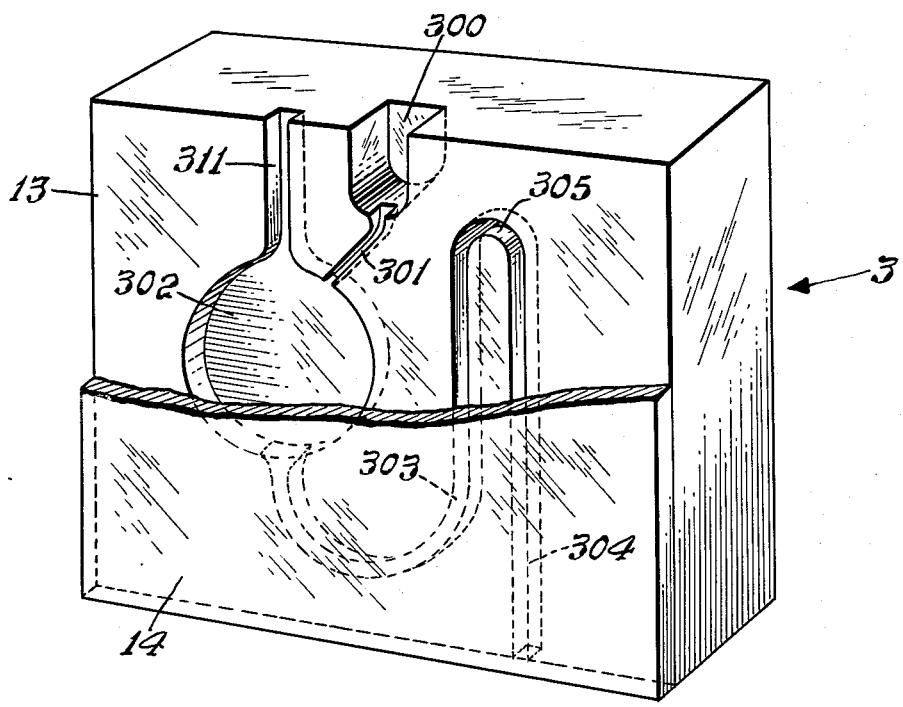

The exact nature of this invention as well as other objects and advantages thereof will be readily appreciated as the same becomes better understood by reference to the following detailed description when considered in connection with the accompanying drawings in which like reference numerals designate like parts throughout the figures thereof, and wherein:

FIG. 1 is a diagrammatic elevational view of an automatic chemical analyzing device of the invention; and FIG. 2 shows a portion of the apparatus of FIG. 1 in a perspective view with a portion of a cover plate removed to illustrate a preferred method of making the analyzing device of the invention.

Referring now to the drawing in detail, and initially to FIG. 1, there is seen an analyzing device including five modular units or elements 1 to 5 which are stacked on top of each other. The several units may be held together merely by their own weight, or they may be clamped together in any desired conventional manner to hold them in superposition as illustrated in the drawing.

The units illustrated are in sequence, from the top down, an atuomatic sampling pipette 1; an automatic pipette 2 for adding a first reagent to the sample drawn by the sampling pipette 1; a first reaction chamber 3; a second automatic pipette 4 for adding a second reagent to the reaction product from the chamber 3; and a second reaction chamber or mixing chamber 5.

The automatic sampling pipette 1 is of the type disclosed in my copending application Serial Number 187,278, filed on April 13, 1962, now Patent No. 3,085,717. It includes a bulb 101, an S-shaped siphon tube 111 communicating with the bottom of the bulb 101 and having a bight portion 112 substantially higher than the bulb 101. A pressure tube 106 is connected to the top of the bulb 101.

The pressure tube 106 is upwardly arched above the level of the siphon portion 112, and connects the bulb 101 with a source of air under pressure, as will become apparent hereinafter.

A storage tank 103 contains a body of the liquid 131 which is to be sampled by the pipette. The level 133 of the liquid 131 is maintained constant, and the composition of the liquid is held equal to that of a process stream or the like which it is desired to analyze. For that purpose there is provided an overflow pipe 132 and a supply pipe 134 from which a by-passed portion of the process stream may be continuously or intermittently fed to the tank 103. The liquid overflowing from the tank 103 may be returned to the process stream or disposed otherwise through a drain 135.

The tank 103 communicates with a substantially closed transfer vessel 108 through a narrow pipe 107. An air vent tube 181 connects the top of the vessel 108 with the atmosphere. An approximately U-shaped connecting tube 102 connects a portion of the vent tube 181 closely adjacent the top of the vessel 108 with a portion of the pressure tube 106 closely adjacent the top of the bulb 101. An S-shaped siphon tube 182 communicates with the bottom of the transfer vessel 108 and has an upper bight portion 183 which is slightly above the common normal liquid level 133 in the tank 103, the juncture of the vent tube 181 with the connecting tube 102, the junction of the pressure tube 106 with connecting tube 102, and which is much above the terminal discharge orifice of the siphon tube 111.

The siphon tubes 111 and 182 have respective terminal discharge orifices in their free end portions 113 and 184. The discharge orifice in the end portion 113 is aligned with a corresponding aperture in the first reagent pipette 2. The discharge orifice in the end portion 184 communicates with a drain 109 which in the example of the invention illustrated is integral with the first reagent pipette 2. The drain communicates with the main process stream through a pipe 191.

The bulb 101 and siphon tube 111 together with an ascending portion 161 of the pressure tube 106 contiguously adjacent the bulb 101 constitute a first tubular siphon arrangement having an upper orifice above the level of the bight portion 112 where the afore-mentioned portion 161 of the pressure tube 106 is integrally joined to the remainder of the pressure tube, and a lower terminal orifice in the end portion 113 below the level of the lower bight portion of the siphon tube 111.

The transfer vessel 108 together with its vent tube 181 and the siphon tube 182 constitutes a second tubular siphon arrangement having an upper terminal orifice in the vent tube 181 above the level of the bight portion 183, and a lower terminal orifice in the end portion 184 of the siphon tube 182, below the level of the lower bight portion 185 of the siphon tube 182.

The normal liquid level 133 in the tank 103 is thus below the upper bight portions 112 and 183, and above the connecting tube 102. The feed pipe 107 which is narrower than any other conduit in the two siphon arrangements directly communicates with the transfer vessel 108 below the level of the junction between the connecting tube 102 and the vent tube 181.

As set forth in more detail in my afore-mentioned copending application, a short air pressure pulse applied to the liquid in the bulb 101 through the tube 106 causes a precisely measured sample of the liquid supplied from the supply pipe 134 to be discharged from the end portion 113 of the siphon tube 111 into the first reagent pipette 2.

The reagent pipette 2 is of the general type disclosed in my copending application Ser. No. 111,342 filed on May 19, 1961, now Patent No. 3,186,808. It includes a bulb or dosing vessel 201 having the shape of a portion of a sphere. An S-shaped siphon tube 211 is connected to the bottom of the vessel 201. The top of the vessel is connected by a very narrow inlet tube 202 to a reagent supply tank 203 in which a normal level 231 of a liquid reagent is maintained by a non-illustrated overflow arrangement identical with the one shown in the sampling pipette 1. The inlet tube 202 is entirely below the liquid level 231, and rises in a direction from the reagent tank 203 toward the bulb 201. The higher bight portion 212 of the siphon tube 211 is slightly above the normal liquid level 231 in the supply tank 203. The discharge portion 213 of the siphon tube 211 extends downward to an orifice which is much below the bottom of the bulb 201.

A connecting tube 204 extends upward from the top of the bulb 201 to a point well above the liquid level 231. An approximately V-shaped relatively wide tubular container 240 has two upwardly extending branches 245, 246 which are joined at the lowest point of the container. From that point a very narrow drain pipe 241 leads downward and terminates in an orifice near the orifice of the discharge portion 213. The topmost portion of the branch 245 rises above the level 231 and communicates with the connecting tube 204. The uppermost portion 242 of the branch 246 is expanded to form a funnel aligned with the end portion 113 of the siphon tube 111.

An air vent 243 is arranged in the branch 246 subjacent the funnel 242. Any liquid accidentally spilled from the air vent is received by a drain 244 which is connected to a waste receptacle.

The first reagent pipette 2 operates as follows:

A reagent solution from the tank 203 normally fills the inlet tube 202, the dosing vessel 201, and the portion of the siphon tube 211 adjacent the vessel 201 to a point on the level 231 and below the bight 212. The portion of the connecting tube 204 extending upward from the vessel 201 also is filled with reagent to the level 231.

When a liquid sample is rapidly discharged from the sampling pipette 1 through the relatively wide siphon tube 111, a body of liquid quickly collects in the V-shaped container 240. It fills the juncture between the branches 245, 246, and then rises in the two branches. The air displaced from the branch 246 is discharged through the vent 243. The air trapped in the branch 245 by the rising liquid exerts pressure on the liquid in the bulb 201 and the inlet tube 202. The flow section of the siphon tube 211 is substantially greater than that of the inlet tube 202. The reagent liquid is displaced by air from the junction of the tubes 202, 206 with the bulb 201. The liquid level in the siphon tube 211 therefore rises until the bight portion 212 of the siphon tube is filled, whereupon the contents of the bulb 201 are rapidly discharged through the discharge portion 213 of the siphon tube into the reaction chamber 3. Simultaneously with this discharge, the sample liquid flows through the narrow tube 241 into the reaction chamber.

The reaction chamber 3 includes a feed funnel 300 for receiving the sample and the precisely metered first reagent from the pipette 2. The funnel 300 communicates with a bulb 302 of part-spherical shape by a narrow conduit 301. An S-shaped siphon tube 303 is connected to the bottom of the bulb 302. The upper bight portion 305 of the siphon tube 303 is at a level substantially higher than the top of the bulb 302. A descending end portion 304 of the siphon tube 303 has a lower discharge orifice aligned with an intake funnel 442 of the second reagent pipette 4. A duct 311 communicates with the top of the bulb 302.

The reaction chamber 3 is shown in more detail in FIG. 2. The several afore-mentioned elements of the reaction chamber are integrally formed by recesses cut in a flat surface of a block 13. The block is made of a material resistant to the sample, the reagents, and the products of reaction. The specific material employed has to be selected to suit the chemicals employed. Polymethylmethacrylate has been found to be readily workable, to resist many chemical agents at room temperature, and to have the added advantage of being transparent so as to permit visual inspection of the processes within the reaction chamber 3. The method of making the reaction chamber 3 is not limited to cutting operations. A block 13 may be cast of plastic or metal. A plastic block may be made in finished shape by injection or compression molding, and other methods of forming a block 13 with connecting recesses in a flat face will readily suggest themselves to those skilled in the art. The recesses are covered by a cover plate 14 which may be of the same material as the block 13, or of different material. It has a flat face closely conforming to the flat face of the block 13 to form a tight seal. When both the block 13 and the cover member 14 are made of plastics such as polymethylmethacrylate, the cover member 14 is preferably secured adhesively to the block 13. The cement or other adhesive used provides a seal between the block and the cover member which may compensate for any lack of precise conformity.

While only the reaction chamber 3 has been illustrated in FIG. 2, it will be appreciated that the several units 1 to 5 of the apparatus may each be produced by shaping respective individual blocks to constitute the interconnected conduits and bulbs shown in FIG. 1, and that the entire apparatus illustrated in FIG. 1 may actually be made of a single block and a single cover member as is evident from FIG. 2.

The duct 311 is connected to a non-illustrated controlled source of compressed air such as a rotary valve driven by a timing motor to release a brief stream of compressed air from a storage tank whenever a passage in a rotating valve member is simultaneously aligned with passages in the fixed valve structure respectively connected to the storage tank and the duct 311. The air admitted through the duct 311 displaces the mixture of reagent and sample from the bulb 302 into the siphon tube 303. When the liquid level rises to the bight portion 305, the contents of the bulb 302 are drained through the siphon tube into the second reagent pipette 4. The air admitted through the duct 311 cannot escape through the siphon tube 211 which is sealed by liquid reagent, and cannot escape through the very narrow drain pipe 241 at a rate sufficient to interfere with actuation of liquid discharge from the siphon tube 303.

The working elements of the second reagent pipette 4 are substantially identical with those of the pipette 2 and operate in the same manner. Discharge of the reaction product from the chamber 3 into the intake funnel 442 triggers release of a metered amount of a second reagent from the supply tank 403 of the second reagent pipette through a siphon tube 411 while the reaction mixture is more slowly released through a narrow drain pipe 441.

The size of the bulb 502 is selected in such a manner that the precisely predetermined volume of liquid discharged from the second reagent pipette 4 would fill the bulb 502, the conduit 501, the funnel 500, and the siphon tube 503 to a level above the upper bight portion of the siphon tube 503. The liquid entering the funnel 500 from the tube 411 and the pipe 441 are intimately mixed by the difference in the flow sections of the funnel 500, the conduit 501, and the bulb 502. The mixture formed is automatically discharged through the siphon tube 503 into a photometer 9.

Only those elements of the photometer have been shown which are necessary to an understanding of the invention. They include a funnel 900 arranged to receive the liquid mixture discharged from the siphon tube 503 and to feed it to the cell 6 of the photometer. The bottom of the photometer cell communicates with an S-shaped siphon tube 901 arranged in such a manner that the mixture discharged from the second reaction chamber 5 is received in the photometer cell without priming the siphon tube. An air duct 912 connects the top of the cell 6 to the afore-mentioned non-illustrated rotary valve for admission of a timed pulse of compressed air at a rate sufficient to depress the liquid level in the photometer cell 6 and to prime the siphon tube 901.

The mechanism by means of which the photometer 9 yields a reading of an optical property of the contents of the cell 6 is represented merely by a galvanometer 902, but will be understood to include the usual source of a light beam which is passed through the cell 6, a photoelectric cell arranged to receive the beam after its passage through the cell 6, and a conventional electric circuit to transform the output signal of the photoelectric cell into a reading on the galvanometer 902 the scale of which may be calibrated in units of chemical composition of the sample drawn from the process stream through the supply pipe 134.

The mixture discharged from the photometer cell 6 by a pulse of compressed air is discharged into a signal generating unit 7 substantially identical with respective portions of the reagent pipettes 2 and 4. An approximately V-shaped tubular container 701 of the signal generating unit 7 has an upwardly open branch 702 and a substantially closed vertically elongated branch 703. The branches 702 and 703 are joined at the bottom. The open top of the branch 702 is flared to form a funnel 704 in which the material discharged from the photometer cell 6 is received. The closed top of the branch 703 is connected by the above-mentioned pressure tube 106 to the bulb 101 of the sampling pipette 1. The bottom of the container 701 is equipped with a drain pipe 705 sufficiently narrow to retard the release of the liquid received from the siphon tube 901 until the trapped air in the branch 703 has been compressed and partly transferred to the bulb 101. Eventually, all liquid is discharged from the signal generating unit 7 to a waste receptacle 706.

In a specific application, the apparatus illustrated may be employed to indicate whether acid wastes from a chemical plant have been adequately neutralized in a continuous waste treatment plant not itself relevant to this invention. A portion of the stream of treated waste liquid is fed continuously to the supply pipe 134. Dilute sodium hydroxide solution of known concentration is fed to the reagent supply tank 203, and a dilute solution of an indicator, such as phenolphthalein, is fed to the tank 403. The size of the bulb 201 is chosen so that the sodium hydroxide solution metered by the pipette 2 and mixed with the metered sample of treated waste in the reaction chamber 3 will normally be sufficient to make the mixture alkaline. It will thus show a purple color upon admixture of the indicator from the second reagent pipette 4 in the mixing chamber 5. The photometer 9 readily distinguishes between the normal purple color of the effluent from the mixing chamber 5 and the practically colorless liquid discharged if the acid content of the sample is more than the equivalent of the sodium hydroxide reagent.

It will be appreciated that the apparatus illustrated is capable of automatically performing more complex analyses than the simple alkalimetric titration chosen for the purpose of illustration. Regardless of the chemical reactions performed in the apparatus, it operates in the following manner:

A pulse of compressed air admitted by a control unit such as a timing valve to the cell 6 discharges a liquid into the container 701 and generates a pneumatic signal which is transmitted to the sampling pipette 1 by the pressure tube 106. The pipette 1 responds to the signal by releasing a metered liquid sample to the container 240 of the first reagent pipette 2. The sample received causes the first reagent pipette 2 to transfer a precisely metered amount of a first liquid reagent to the reaction chamber 3 where the reagent is mixed with the liquid sample and permitted to react with the same for a period of time controlled by the admission of air under pressure through the duct 311.

Upon receipt of the pneumatic signal constituted by the admitted air, the reaction chamber 3 discharges its contents into the second reagent pipette 4 which reacts by releasing a metered amount of a second liquid reagent to the mixing chamber or second reaction chamber 5 which also receives the reacted liquid from the first reaction chamber 3. The resulting mixture is held in the second reaction chamber for a period which may be varied by suitably selecting the flow sections of the liquid paths to and from the bulb 502, and is then released for measurement of a physical property related to the chemical property of the original sample in the cell 6. Release of the reaction mixture from the cell 6 by a pulse of air from the duct 912 initiates the next analysis cycle.

The number of units constituting an automatic chemical analyzing device of the invention may be varied to suit specific requirements. The method of the invention will normally be carried out in apparatus consisting of at least a sampling pipette, a reagent pipette, and a measuring unit to determine a physical property of the reaction product between sample and reagent. The term "reaction" and related terms as employed in this specification and the appended claims are not necessarily limited to irreversible chemical reactions, but will be understood to include the changes in the structure of an indicator in the presence of certain concentrations of hydrogen ions, and the like.

It is characteristic of the several units or elements of analyzing devices of this invention that they do not contain moving mechanical parts; that the flow of reagents and samples is energized only by gravity, and triggered by pressure in a fluid substantially insoluble in the reagent and sample liquids. In a commercially useful embodiment of the invention, the air pressure required for sequentially actuating transfer of aqueous liquid between the units has been found to be approximately 3 centimeters water column.

While the invention has been illustrated by a specific embodiment employing a photometer as an instrument for measuring a physical property of a reaction product indicative of the chemical composition of the original sample, the invention is not limited to photometers, to optical instruments, nor to indicating instruments generally. Obviously those skilled in the art will readily substitute other measuring devices for the specifically disclosed photometer. These other devices may furnish a signal responsive to an instantaneous physical property, as in an indicating instrument, a graphic signal showing the variation of such a property, or a signal not necessarily available to the human senses and directly employed in a feed back arrangement for adjustment of a variable in a chemical process from which the original sample was taken.

Obviously, many other modifications and variations of the present invention are possible in the light of the above teachings. It is therefore to be understood that within the scope of the appended claims, the invention may be practiced otherwise than as specifically described.

What is claimed is:

1. An automatic chemical analysis apparatus comprising, in combination:
   (a) a source of a liquid;
   (b) sample pipette means operatively connected to said source and responsive to a signal for releasing a metered sample amount of said liquid from said source;
   (c) a source of a reagent liquid;
   (d) reagent pipette means operatively connected to said sample pipette means and said source of a reagent liquid, said reagent pipette means being responsive to said releasing of said sample amount for releasing a metered amount of said reagent liquid from said source of a reagent liquid;
   (e) reaction chamber means connected to said sample pipette means and to said reagent pipette means for jointly receiving said released metered amounts for reaction of said sample amount with said reagent liquid amount in said chamber means to form a mixed reacted liquid, said chamber means being responsive to a signal for releasing the reacted liquid;
   (f) connecting means connecting to said reaction chamber means for connecting the latter to a signal source;
   (g) measuring means operatively connected to said reaction chamber means for receiving said released reacted liquid, and for measuring a physical property thereof;
   (h) discharge means operatively connected to said measuring means for substantially completely discharging said received liquid from said measuring means; and
   (i) signal generating means operatively connected to said discharge means and to said sample pipette means, said signal generating means being responsive to the discharging of said received liquid from said measuring means to generate the signal to which said sample pipette means is responsive.

2. An apparatus as set forth in claim 1, wherein said signal generating means includes fluid pressure generating means responsive to the discharging of said received liquid to generate a fluid pressure pulse constituting the signal generated, and said sample pipette means include siphon means responsive to said pulse for releasing said sample amount by gravity.

3. An apparatus as set forth in claim 1, wherein said sample pipette means, said reagent means, and said reaction chamber means constitute elements of said apparatus, and at least one of said elements includes a block member having a face formed with recesses therein, and a cover member secured to said face for covering said recesses, the covered recesses constituting conduits for passage of a respective one of said liquids.

4. An apparatus as set forth in claim 1, wherein said reagent pipette means include a vessel communicating with said source of reagent liquid, and a siphon connecting said vessel to said reaction chamber means; and said sample pipette means include pulse generating means connected to a portion of said vessel spaced from said siphon for transmitting a pulse of gas under pressure to said vessel responsive to said releasing of a metered sample amount from said sample pipette means, and for thereby priming said siphon, whereby an amount of reagent liquid from said source is released from said vessel to said chamber means.

5. An automatic chemical analysis apparatus comprising, in combination:
   (a) a source of a first liquid;
   (b) first pipette means responsive to a first signal for releasing a metered amount of said first liquid from said source;
   (c) a source of a second liquid;
   (d) second pipette means responsive to said releasing of said amount of said first liquid for releasing a metered amount of said second liquid from said source thereof;
   (e) a source of a second signal;
   (f) chamber means for jointly receiving and mixing said released metered amounts to form a mixed liquid, said chamber means being connected to said source of a second signal for releasing said mixed liquid responsive to said second signal;
   (g) measuring means arranged to receive said released reacted liquid for measuring a physical property thereof;
   (h) means for substantially completely discharging said received liquid from said measuring means; and
   (i) signal generating means responsive to said discharging of said received liquid from said measuring means to generate said first signal.

6. An automatic chemical analyzing apparatus comprising, in combination:
   (a) a source of a liquid;
   (b) sample pipette means operatively connected to said source and responsive to a signal for releasing a metered sample amount of said liquid from said source;
   (c) a source of a first reagent liquid;
   (d) first reagent pipette means operatively connected to said sample pipette means and said source of a first reagent liquid, said first reagent pipette means being responsive to said releasing of said sample amount for releasing a metered amount of said reagent liquid from said reagent liquid source;
   (e) reaction chamber means connected to said sample pipette means and said first reagent pipette means for jointly receiving said released metered amounts for reaction of said sample amount with said reagent liquid amount in said chamber means to form a mixed reacted liquid, said chamber means being responsive to a signal for releasing the reacted liquid;
   (f) connecting means connecting to said reaction chamber means for connecting the latter to a signal source;
   (g) a source of a second reagent liquid;
   (h) second reagent pipette means operatively connected to said source of a second reagent liquid and to said reaction chamber means, and responsive to the releasing of said reacted liquid by said reaction chamber means for releasing a metered amount of said second reagent liquid from said source of a second reagent liquid;
   (i) mixing means connected to said reaction chamber means and said second reagent pipette means for jointly receiving said reacted liquid and said metered amount of said second reagent liquid, whereby said reacted liquid and said metered amount of said second reagent liquid form a mixed liquid;
   (j) measuring means operatively connected to said mixing means for measuring a physical property of said mixed liquid;
   (k) discharge means operatively connected to said mixing means for substantially completely discharging said mixed liquid from said mixing means; and
   (l) signal generating means operatively connected to said discharge means and to said sample pipette means, said signal generating means being responsive to the discharging of said mixed liquid from said mixing means to generate the signal to which said sample pipette means is responsive.

7. An automatic chemical analyzing apparatus comprising, in combination:
(a) a source of a first liquid;
(b) first pipette means operatively connected to said source and responsive to a first signal for releasing a metered amount of said first liquid from said source;
(c) a source of a second liquid;
(d) second pipette means operatively connected to said first pipette means and to said source of a second liquid, and responsive to said releasing of said amount of said first liquid for releasing a metered amount of said second liquid from said source thereof;
(e) a source of a second signal;
(f) chamber means operatively connected to said first and second pipette means for jointly receiving and mixing said released metered amounts to form a mixed liquid, said chamber means being operatively connected to said source of a second signal for releasing said mixed liquid in response to said second signal;
(g) measuring means operatively connected to said chamber means for receiving the released reacted liquid and for measuring a physical property thereof;
(h) discharge means operatively connected to said measuring means for substantially completely discharging said received liquid from said measuring means; and
(i) signal generating means responsive to said discharging of said received liquid from said measuring means to generate said first signal, said signal generating means being operatively connected to said discharge means and to said first pipette means.

8. A method of automatically analyzing the chemical composition of a liquid which comprises:
(a) releasing a metered sample amount of the liquid to be analyzed responsive to a first signal;
(b) releasing a metered amount of a reagent liquid responsive to the release of said sample amount;
(c) jointly receiving said metered amounts in a vessel for reaction therebetween, whereby a mixed reacted liquid is formed;
(d) responsive to a second signal releasing said reacted liquid from said vessel to a measuring means;
(e) measuring a physical property of the released reacted liquid in said measuring means;
(f) discharging the measured liquid from said measuring means; and
(g) generating said first signal responsive to the discharging of said measured liquid from said measuring means.

9. A method as set forth in claim 8, wherein said first and second signals are respective pulses of a fluid under pressure, and said sample amount and said reacted liquid are released to flow by gravity responsive to the respective signals.

10. A method as set forth in claim 8, wherein said first signal is a pulse of a fluid under pressure.

11. A method as set forth in claim 10, wherein said sample amount of a liquid to be analyzed is released to flow by gravity responsive to said first signal.

12. A method of chemically analyzing the chemical composition of a liquid which comprises:
(a) releasing a metered amount of a first liquid responsive to a signal;
(b) releasing a metered amount of a second liquid responsive to said releasing of an amount of said first liquid;
(c) jointly receiving said metered amounts in a vessel and reacting the same with each other to form a reacted liquid;
(d) releasing said reacted liquid to a measuring means;
(e) measuring a physical property of the released reacted liquid in said measuring means;
(f) discharging the measured reacted liquid from said measuring means;
(g) generating another signal responsive to said discharging; and
(h) releasing another measured amount of said first liquid responsive to said other signal.

References Cited by the Examiner
UNITED STATES PATENTS

| | | | |
|---|---|---|---|
| 2,102,282 | 12/1937 | Roy | 23—253 |
| 2,895,808 | 7/1959 | Hartley | 23—270.5 |
| 3,085,717 | 4/1963 | Anscherlik | 222—109 |
| 3,182,865 | 5/1965 | Anscherlik | 222—416 |

FOREIGN PATENTS

| | | |
|---|---|---|
| 848,125 | 9/1959 | Great Britain. |

MORRIS O. WOLK, *Primary Examiner.*

JAMES H. TAYMAN, JR., *Examiner*

J. J. MULLEN, *Assistant Examiner.*